United States Patent
Nakagawa et al.

(10) Patent No.: US 7,177,034 B2
(45) Date of Patent: Feb. 13, 2007

(54) PRINT MANAGING APPARATUS AND PRINT MANAGING METHOD

(75) Inventors: Isamu Nakagawa, Kanagawa (JP); Koji Nozato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 870 days.

(21) Appl. No.: 09/971,691

(22) Filed: Oct. 9, 2001

(65) Prior Publication Data

US 2002/0048036 A1 Apr. 25, 2002

(30) Foreign Application Priority Data

Oct. 11, 2000 (JP) ............................. 2000-310313
Mar. 29, 2001 (JP) ............................. 2001-096700

(51) Int. Cl.
*B41F 33/16* (2006.01)

(52) U.S. Cl. ...................... 358/1.14; 358/1.15; 705/52; 710/15; 710/19; 710/18

(58) Field of Classification Search ............... 358/1.14, 358/1.15; 709/225, 228, 224; 705/52; 710/15, 710/18, 19

See application file for complete search history.

(56) References Cited

U.S. PATENT DOCUMENTS 5,220,674 A * 6/1993 Morgan et al. .............. 709/223
5,559,871 A * 9/1996 Smith ..................... 379/115.01
6,202,092 B1 * 3/2001 Takimoto .................... 709/225

FOREIGN PATENT DOCUMENTS

EP 0 910 008 10/1998

* cited by examiner

*Primary Examiner*—Kimberly Williams
*Assistant Examiner*—Peter K. Hutsinger
(74) *Attorney, Agent, or Firm*—Fitzpatrick, Cella, Harper & Scinto

(57) ABSTRACT

A print managing apparatus according to the invention obtains a print history from a printer on a network and updates a print amount in the printer or an amount in which the printing can be performed by the printer on the basis of the obtained print history, thereby enabling whether the printing is accepted or rejected to be discriminated without inquiring of the print managing apparatus by the printer. A waiting time for use of the printer is shortened.

40 Claims, 15 Drawing Sheets

FIG. 8

| ITEM | DESCRIPTION |
| --- | --- |
| JOB NO. | 33 |
| DIVISION ID | 2800 |
| PROCESS TYPE | COPY |
| PAPER SIZE | A4 |
| NO. OF SHEETS | 3 |
| NO. OF PRINT SIDES | 5 |
| PAPER TYPE | PLAIN |
| AMOUNT OF USE | 5 |
| PROCESS FLAG | UNPROCESSED |

| ITEM | DESCRIPTION |
|---|---|
| JOB NO. | 33 |
| DIVISION ID | 2800 |
| PROCESS TYPE | COPY |
| PAPER SIZE | A4 |
| NO. OF SHEETS | 3 |
| NO. OF PRINT SIDES | 5 |
| PAPER TYPE | PLAIN |
| AMOUNT OF USE | 5 |
| PROCESS FLAG | UNPROCESSED |

1500 ary of the invention will be described in
PRINT MANAGING APPARATUS AND PRINT MANAGING METHOD

BACKGROUND OF THE INVENTION

1. Field of the Invention

The invention relates to a system for unitedly managing use of a printer, a copier, a scanner, a multi-function printer (MFP) having integratedly a printer function, a copying function, and a scanner function, and the like which are connected to a network in a network environment.

2. Related Background Art

Hitherto, a device has been used on the basis of a user's judgment. A device administrator merely presumes an outline of a use situation of the device but cannot make management regarding objects of use and process information of the device. In case of providing a limitation on use of the device, the device administrator presumes the use situation of the device, calculates the limitation, and notifies user of the limitation.

Hitherto, to decide an upper limit of acceptance and make management with respect to use of a printer, there is a following method.

FIG. 11 is a diagram showing a network to which a print management server 1101 and a plurality of printers 1102 and 1103 are connected. In the print management server 1101, a number (hereinafter, referred to as a division ID) has been allocated every division and, further, a past print record and an upper limit have been associated with each other every division ID.

When the user uses one (for example, the printer 1102) of a plurality of printers, he needs to input the division ID. The printer 1102 inquires of the print management server 1101 about the acceptance or rejection of the printing. The inputted division ID is transmitted to the print management server 1101. If the past print record corresponding to the division ID does not exceed the upper limit, use of the printer is accepted and the print management server 1101 notifies the printer 1102 of the acceptance of the printing. If the past print record exceeds the upper limit, use of the printer is rejected and the print management server 1101 notifies the printer 1102 of the rejection of the printing.

When the printing is executed, the print management server increases the past print record associated with the division ID by an amount corresponding to use of the printer. Thus, whichever printer the user uses, the print management server can integratedly manage the past print record.

When the past print record reaches the upper limit, the subsequent printing is rejected by the print management server, so that the user cannot execute the printing.

SUMMARY OF THE INVENTION

Hitherto, however, even if the method of providing the limitation on the basis of the past print record of the user is used, when the past print record reaches an upper limit, use of the printer suddenly becomes unacceptable, so that it is very difficult for the user to use the printer.

In the conventional method mentioned above, when the print management server is not operating, since the past print record cannot be updated, there are problems such that (1) use of the printer has to be inhibited and (2) a use amount of the printer cannot be managed.

Further, since communication between the printer and the print management server is necessary before the user uses the device, there is also a problem such that the user has to wait for use of the printer during such a period of time.

To prevent such a problem, if each printer monitors the use amount only by the device itself without using the print management server at all, it is impossible to grasp how much use amount a certain user has consumed as a total in a plurality of printers.

It is, therefore, an object of the invention to prevent a situation such that when a past print record reaches an upper limit, use of a printer suddenly becomes unacceptable, and to limit use of the printer and notify the user of the limitation in accordance with a current use amount, thereby improving convenience of the user.

Another object of the invention is to enable use of a printer to be limited or managed irrespective of the operation or non-operation of a print management server and to shorten a waiting time for use of the printer, thereby improving a use efficiency of the print management server and operability of the printer.

BRIEF DESCRIPTION OF THE DRAWINGS

FIG. 8 is a diagram showing an example of job logs;

DETAILED DESCRIPTION OF THE PREFERRED EMBODIMENTS

First Embodiment

An embodiment of the invention will be described in detail hereinbelow with reference to the drawings.

The invention is applied to a system comprising a plurality of printers. Naturally, the invention is applied by supplying a program to a system or an apparatus.

Figure 1:
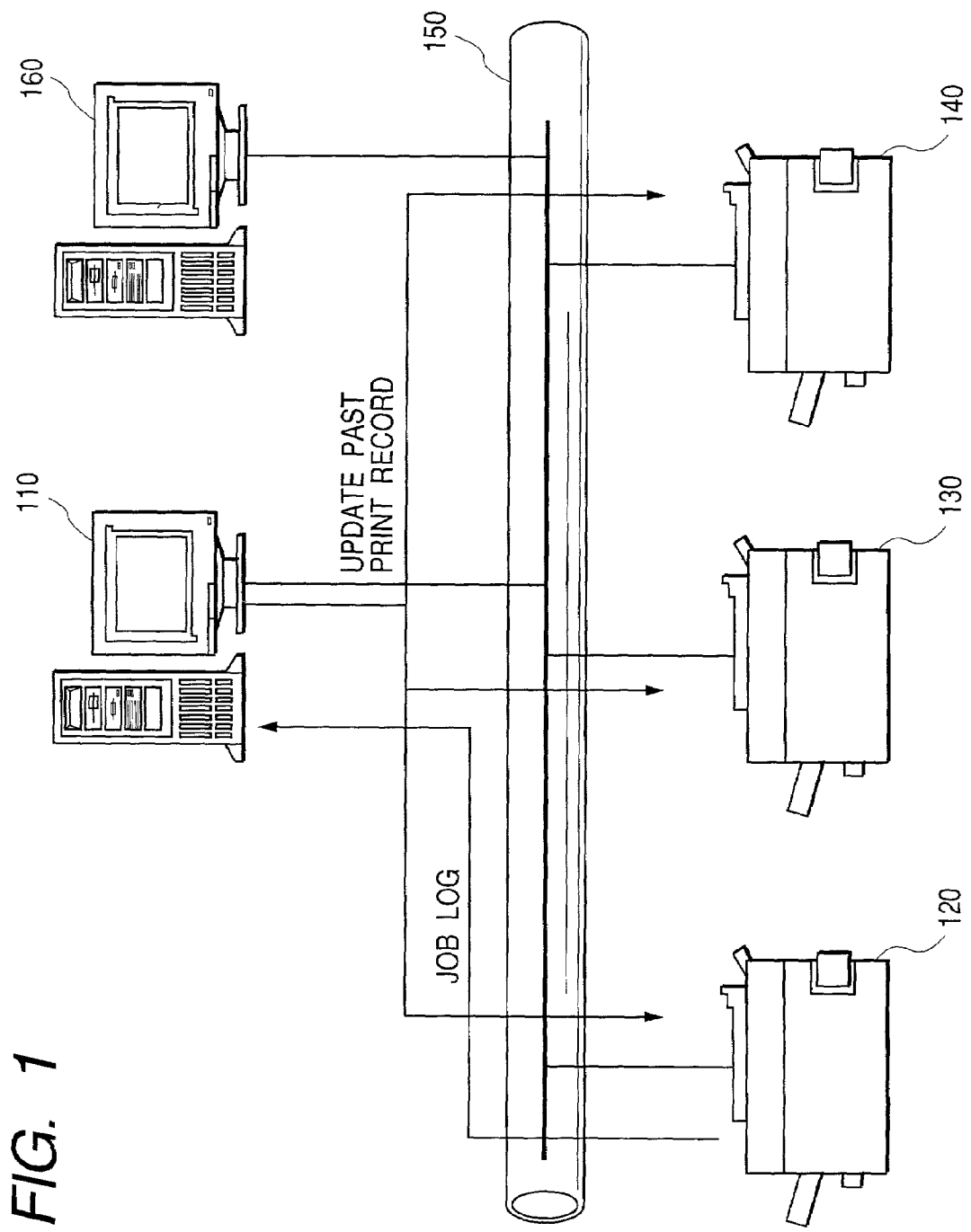
FIG. 1 is a diagram showing a fundamental construction of a whole print management system.

FIG. 1 is a diagram showing a fundamental construction of a whole print management system to which the invention is applied. Reference numeral 150 denotes an Ethernet serving as a physical medium which is used by computers and printers connected to the network when they communicate. Reference numeral 160 denotes a client computer. When the user uses system resources (specifically speaking, printers), a use request is issued to an operating system of the client computer 160. In this instance, the client computer 160 obtains use information regarding the requested system use and transmits it to a server computer 110.

The server computer 110 communicates with the printers connected to the network and executes various processes. The server computer 110 receives the use information of the system resources from the client computer 160 and accumulates the use information into a non-volatile storage such as an HD or the like. Further, with respect to the system resources (specifically speaking, the printers) connected to the network, the presence or absence of a function for holding use history is discriminated. If the use history holding function exists, the use history is obtained from the device.

Reference numerals 120, 130, and 140 denote printers (copiers) each having a function for printing an image read out from an image reading device (scanner). Each of the printers 120, 130, and 140 has an input device for allowing the user to input a division ID. If a past print record of use of the device according to the division ID does not exceed an upper limit, use of the device is accepted. The printers 120, 130, and 140 can also receive print data from a host computer and print an image on the basis of the print data. In this instance, the division ID is inputted from an input screen of the host computer and transmitted to the printer together with the print data. The printer has the use history holding function. The updating of a job log and a past print record in the diagram will be described in detail with reference to a flowchart of FIG. 9, which will be explained hereinlater.

Figure 2:
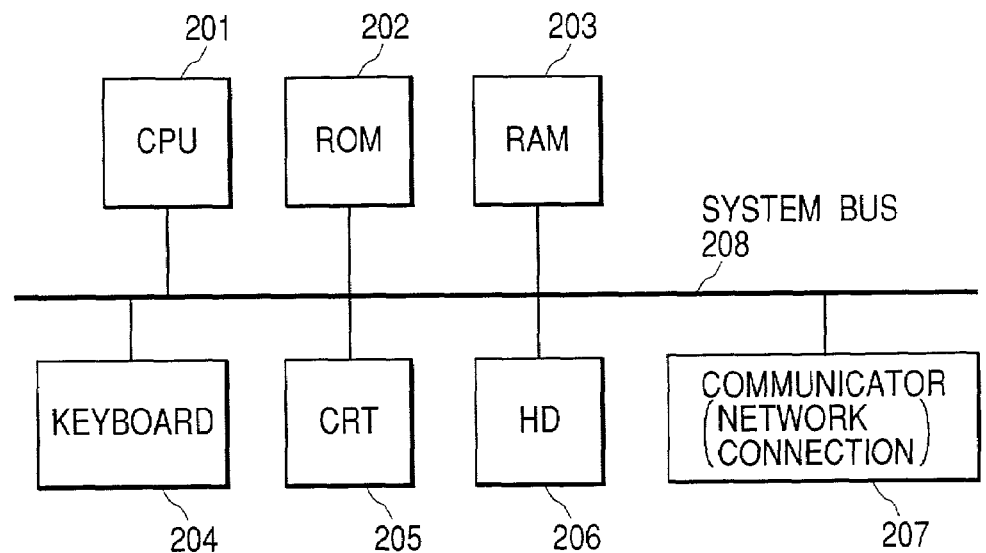
FIG. 2 is a diagram showing an internal construction of a server computer and a client computer.

FIG. 2 is a diagram showing an internal construction of the server computer 110 and client computer 160. In FIG. 2, reference numeral 201 denotes a CPU (that is, central processing unit) for performing a control, an arithmetic operating process, and the like of the whole computer apparatus. Reference numeral 202 denotes an ROM (that is, read only memory) serving as a memory area for storing information such as a system activating program and the like. Reference numeral 203 denotes an RAM (that is, random access memory) serving as a data memory area without a use limitation. Programs such as operating system, application, device driver, communication control, and the like are loaded into this area and executed.

Reference numeral 204 denotes a KBC (that is, keyboard controller) for receiving input data from a keyboard and transferring it to the CPU; 205 indicates a CRT (that is, display controller) for performing a display control to a display device; and 206 shows an HD (that is, hard disk drive) for storing the programs and data. Upon execution, the stored programs and data are referred to or loaded into the RAM as necessary. An FD (that is, floppy disk drive), an SRAM (that is, non-volatile storage), or the like can be also provided in place of the HD 206.

Reference numeral 207 denotes a communicator for performing a network communication control. The communicator 207 can communicate with other computers and peripheral devices connected to the network as described in FIG. 1. Reference numeral 208 denotes a system bus serving as a path of data among the foregoing component elements.

Figure 3:
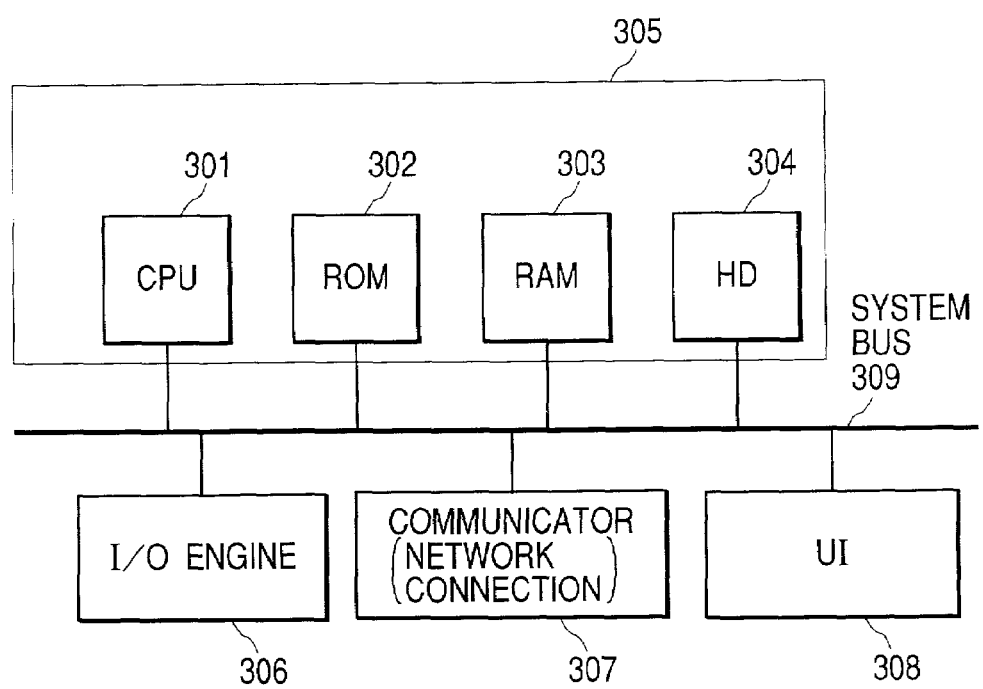
FIG. 3 is a diagram showing an internal construction of a copier.

FIG. 3 is a diagram showing an internal construction of the printers (copiers) 120, 130, and 140. In FIG. 3, reference numeral 305 denotes a controller for controlling the whole peripheral devices. An internal construction of the controller is as shown below. Reference numeral 301 denotes a CPU (that is, central processing unit) for performing a control, an arithmetic operating process, and the like of the controller. Reference numeral 302 denotes an ROM (that is, read only memory) serving as a memory area for storing information such as a system activating program and the like. Reference numeral 303 denotes an RAM (that is, random access memory) serving as a data memory area without a use limitation. Programs such as operating system, communication control, engine control, and the like are loaded into this area and executed. Reference numeral 304 denotes an HD (that is, hard disk drive). A non-volatile storage such as an SRAM or the like can be also provided in place of the HD 304.

Reference numeral 306 denotes an I/O engine of the printer for executing the printing operation or image reading operation under the control of the controller 305. Reference numeral 307 denotes a communicator for controlling network communication. Reference numeral 308 denotes a user interface (UI) for accepting an input from the user and displaying information to the user. Means for displaying can be a panel having a function for displaying a character train or a display capable of displaying an arbitrary image. Reference numeral 309 denotes a system bus serving as a path of data among the foregoing component elements.

Figure 4:
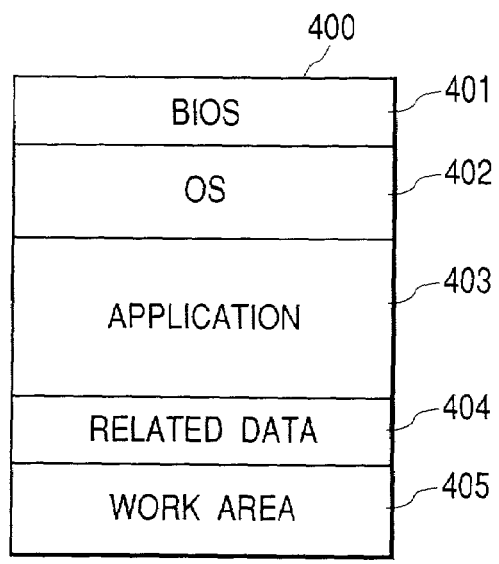
FIG. 4 is a diagram showing memory maps in a memory medium in the server computer.

FIG. 4 is a diagram showing memory maps in the memory medium in the server computer 110. Reference numeral 401 denotes a basic I/O program (BIOS); 402 a memory map in a state where the operating system can be executed; 403 a memory map in a state where the control program according to the invention can be executed; 404 a memory map in a state where the related data can be executed; and 405 a memory map of a work memory which is used by each program.

Figure 5:
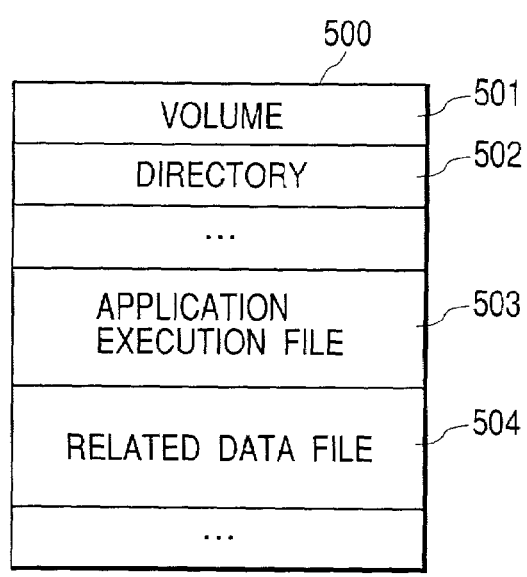
FIG. 5 is a diagram showing memory maps in a floppy disk (FD) in which a control program and related data have been stored.

FIG. 5 is a diagram showing memory maps in the floppy disk (FD) in which the control program and the related data according to the invention have been stored. A volume 501, a directory 502, an application execution file (control program according to the invention) 503, and a related data file 504 associated with the print management system have been recorded in a memory area 500 in the floppy disk (FD).

Figure 6:
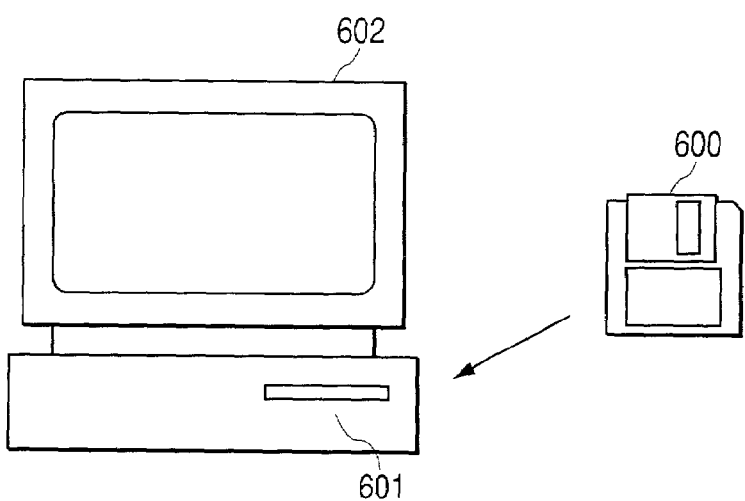
FIG. 6 is a diagram showing that the control program and the related data are loaded into a computer.

FIG. 6 is a diagram showing that the control program and the related data according to the invention are loaded into a computer. As shown in FIG. 6, the control program and the related data which were recorded in a floppy disk (FD) 600 are loaded into a computer system 602 through an FD drive (DKC) 601. When the floppy disk (FD) 600 is set into the FD drive (DKC) 601, the control program and the related data are read out from the floppy disk (FD) 600, loaded into the RAM 203, and can be used under the control of the operating system 402 and BIOS 401.

Figure 12:
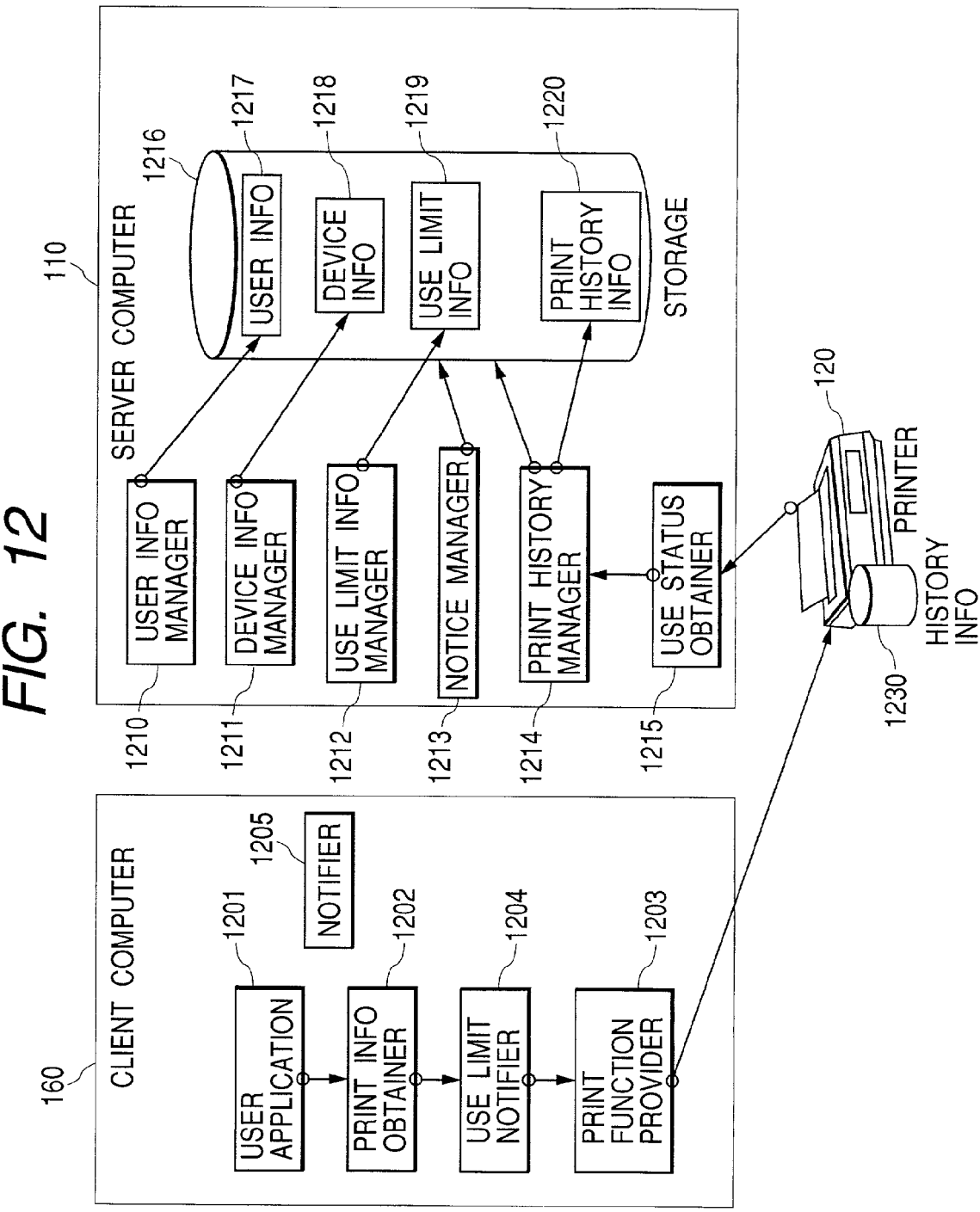
FIG. 12 is a diagram showing a functional construction of the print management system.

A print management system for preventing a situation such that when a past print record reaches an upper limit, use of the printer suddenly becomes unacceptable, limiting use of the printer, and notifying the user of the use limitation in accordance with a current use amount for the past print record will be first described. FIG. 12 is a diagram showing a functional construction of the print management system according to the invention.

The client computer 160 comprises: a user application 1201 for editing a document, an image, or the like and issuing a print request; and a print function provider 1203 for accepting the print request from the user application 1201 and outputting print information to the printer 120. In the present system, a print information obtainer 1202 obtains the print information regarding the print request before the print function provider 1203 receives the print request from the user application 1201.

The print information includes: the number of copies; the number of pages; a size of print paper; a type of paper which is used; user information of the user who issued the print request; color print information; and the like.

A use limit notifier 1204 performs a notification or stops a designated print command on the basis of a past print record and use conditions of the user upon printing. Such a notice can be displayed on a screen of the client computer or can be also a log file. There is also a case where those information is indirectly notified like mail. The client computer 160 also has a function for allowing the user to select a proper one of a plurality of notifying methods.

The server computer 110 has a storage 1216 for storing user information 1217, device information 1218, print history information 1220, and use limit information 1219. The server computer 110 also has: a user information manager 1210; a device information manager 1211; a use limit information manager 1212; and a print history manager 1214. The administrator sets information for managing use in the user information manager 1210, device information manager 1211, and use limit information manager 1212.

The user information 1217 includes a computer login name and a network login name of the user who uses the device and provides information for specifying the user who used the device. The device information 1218 includes a print speed of the device, color information, a network address, and the like. The use limit information 1219 includes a ratio of the past print record to the upper limit of the user and a ratio of the upper limit to the past print record of the device as conditions to be notified. They can be set to certain predetermined values or it is possible to perform a notification in accordance with a plurality of ratio values or limit in accordance with a plurality of ratio values. For example, a notification is made at 80% and the printing is stopped at 100%.

When the user issues the print request by the user application 1201, the print information obtainer 1202 obtains the print information in detail. The obtained print information is transmitted to the print history manager 1214 on the server computer 110. The print history manager 1214 on the server computer 110 adds the received print information to the print history information 1220.

The print history manager 1214 requests the history information from the printer 120 having history information 1230 in the device, obtains the history information, and adds it into the print history information 1220 existing in the storage 1216. The above processes can be periodically executed or can be also executed from the device side at a point when a memory capacity of the area where the history information 1230 in the device becomes a small amount.

When the user issues the print request by the user application 1201, the use limit notifier 1204 obtains the print information from the print information obtainer 1202 and inquires of a notice manager 1213 of the server computer 110 about whether the printing can be executed or not and whether it is necessary to notify the user or not. If it is necessary to limit, the print command is stopped. If it is necessary to notify, the user is notified.

The notice manager 1213 on the server computer discriminates the necessity about the notification on the basis of the user information 1217, device information 1218, use limit information 1219, and print history information 1220 in the storage. If it is necessary to notify, the notice manager 1213 issues a notifying command to a notifier 1205 on the client computer of the user. The notifier 1205 can be a dedicated message display program or can be also a mail program in case of using a mail function for the notice itself.

Figure 13:
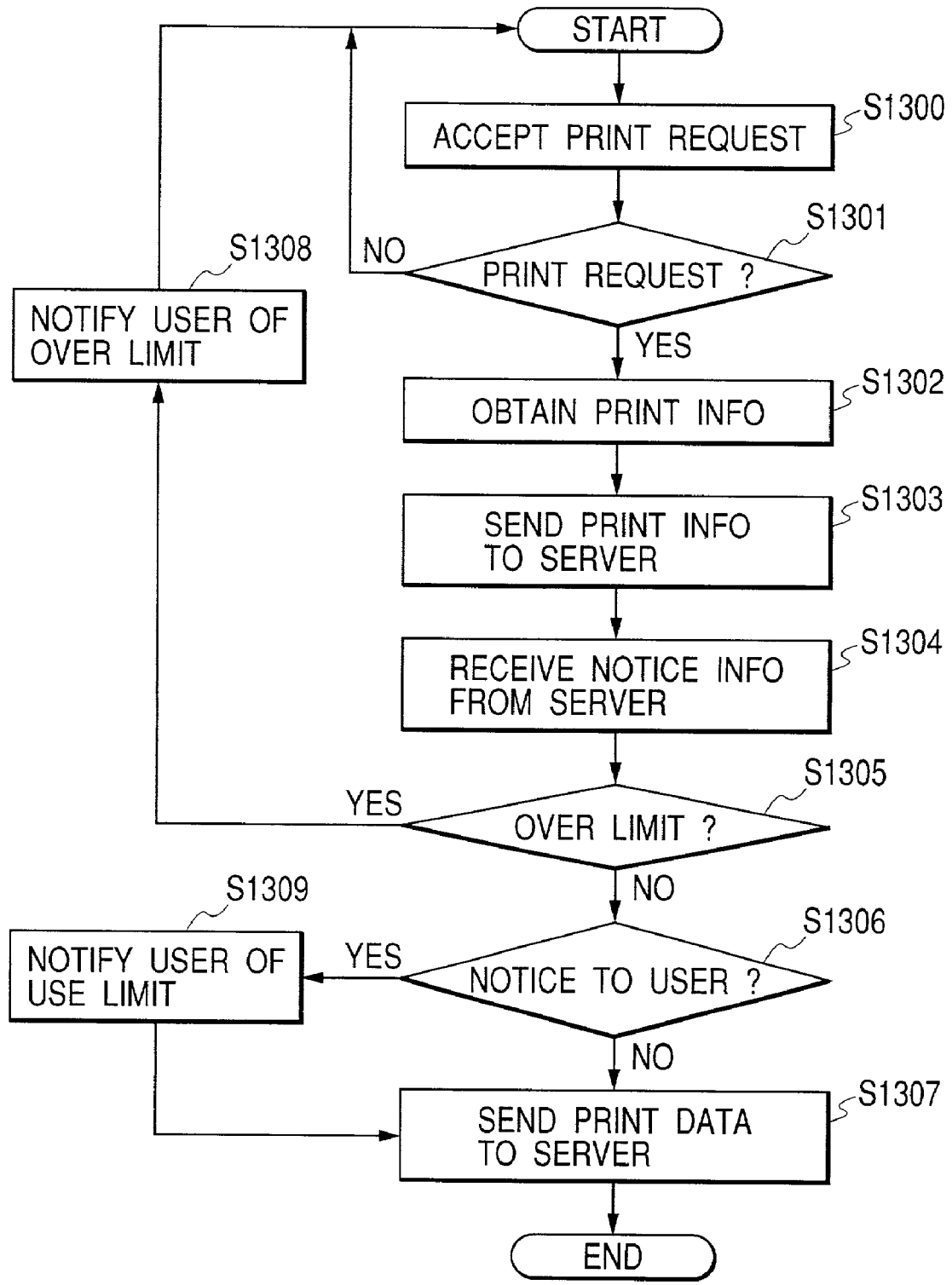
FIG. 13 is a flowchart showing processes of the print management system.

FIG. 13 is a flowchart showing the operation on the client computer. According to processes in this flowchart, a situation such that when the past print record reaches the upper limit, use of the printer suddenly becomes unacceptable is avoided, and all of the information regarding use of the device is managed in detail and fine notification and limitation for the current use amount for the past print record are performed.

First, in step S1300, printing of a document to be printed is designated. The print designation denotes a designation of an output printer, an output range, the number of print sheets, and the like. After the print designation, the actual printing is executed. In step S1301, the presence or absence of the print request is discriminated on the basis of contents of the print designation in step S1300.

In step S1302, the print information, that is, the number of print sheets and the user information are obtained in order to make proper print management. In step S1303, the print information obtained in the above step is transmitted to the server computer. In the server computer, whether it is necessary to notify the user or not or whether the print request should be limited or not is discriminated on the basis of the received print information and the print history information, user information, device information, and notifying conditions which have been stored. A discrimination result is transmitted to the client computer. In step S1304, the client computer obtains those information.

In step S1305, whether the print request is over the limit or not is discriminated. If YES, step S1308 follows. The user is notified of the fact that it is over the limit. The printing process is finished. If NO, step S1306 follows.

In step S1306, whether information which should be notified to the user exists or not with respect to the print request is discriminated. If it is necessary to notify, step S1309 follows and the user is notified. The case where it is necessary to notify is a case where the print request exceeds a predetermined amount and approaches the limit. After that, if the user does not cancel the printing process, step S1307 follows and the print data is transmitted. If there is no need to notify, step S1307 directly follows and the print data is transmitted.

According to the above method, a situation such that when a past print record reaches an upper limit, use of the printer suddenly becomes unacceptable is avoided, and by limiting use of the printer and notifying the user of the use limitation in accordance with the current use amount for the past print record, the convenience of the user is improved.

In the above example, when the client computer transmits the print data, the server computer is inquired about the acceptance or rejection of the printing. However, when the server computer is not operating, the acceptance or rejection of the printing cannot be inquired. A print management system which can made print management even in the case where the server computer is not operating when the print request is issued will be described hereinbelow.

Figure 7:
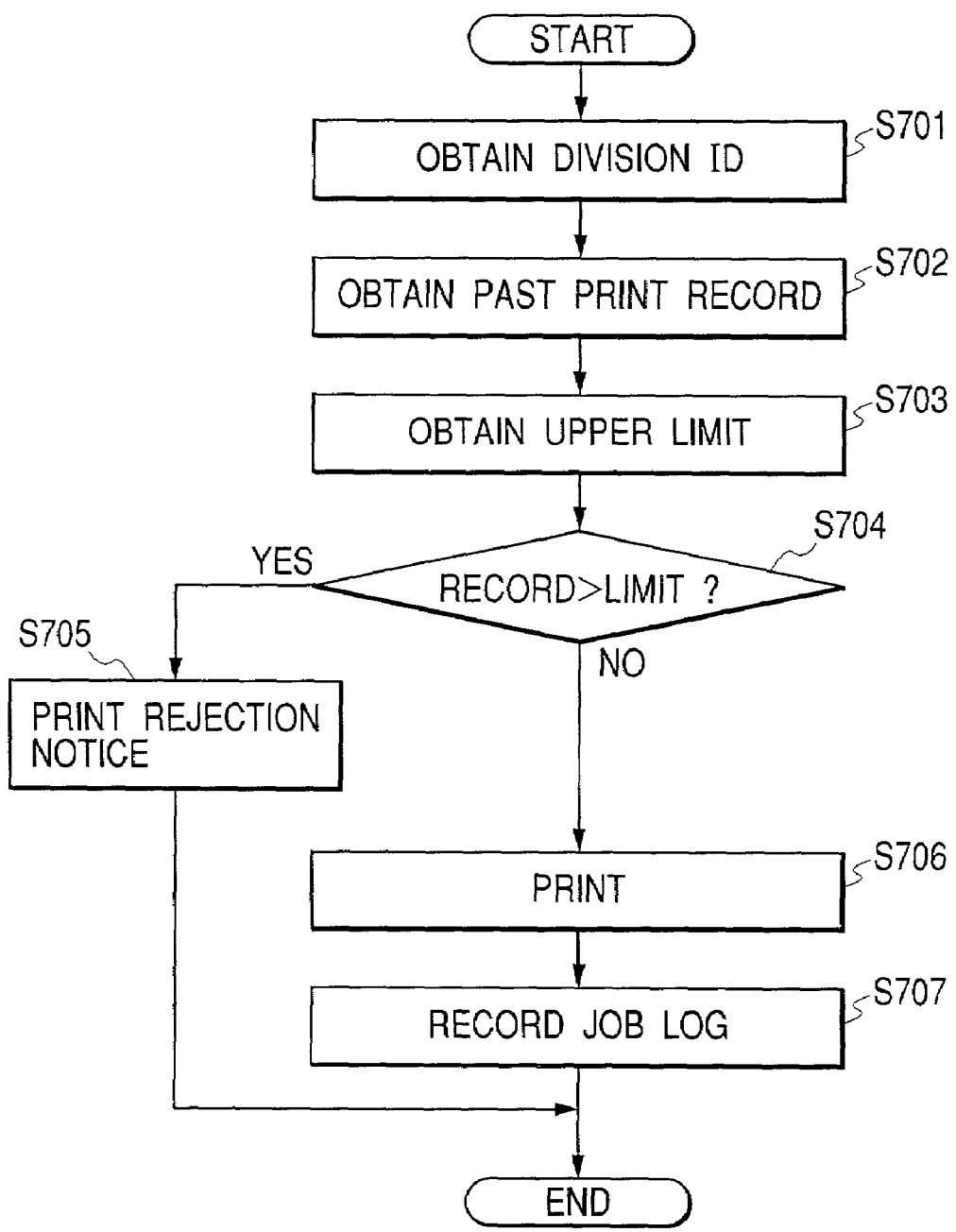
FIG. 7 is a flowchart showing the operation of the copier in the print management system.

FIG. 7 is a flowchart showing the operation of the printers 120, 130, and 140 in the print management system according to the invention.

In step S701, the user inputs the division ID by the user interface 308, so that the printer obtains the division ID inputted by the user, or the printer receives the print data from the host computer and obtains the division ID added to the print data.

In step S702, the past print record associated with the obtained the division ID is obtained from the HD 304. In step S703, the upper limit associated with the obtained the division ID is obtained from the HD 304. In step S704, whether the past print record exceeds the upper limit or not is discriminated. If YES, step S705 follows. If NO, step S706 follows.

In step S705, the user interface 308 is notified of a message showing "since the past print record exceeds the upper limit, use is rejected" and the processing routine is finished. The host computer is notified of a message showing "since the past print record exceeds the upper limit, use is rejected". The host computer receives such a notification and allows such a message to be displayed on the display screen.

In step S706, a copying process is executed in accordance with the operation of the user, or a printing process is executed on the basis of the print data received from the host computer. In step S707, the past print record of the device in step S706 is recorded as a job log onto the HD 304.

FIG. 8 shows an example of job logs. The job log is formed every job and accumulated onto the HD 304. As job logs, a job number, a division ID, a process type, a paper size, the number of sheets, the number of print sides, a paper type (a plane paper, a glossy paper, an OHP paper, etc.), an amount of use, and a process flag are recorded. The use amount is the number of sheets, the number of print sides (each of the obverse and the reverse of a paper is counted as "1"), or the like and coefficients can be also changed in dependence on the paper size or the paper type. For example, assuming that the use amount of the A4 paper is set to "1", the use amount of the A3 paper can be set to "2", or assuming that the use amount of the plain paper is set to "1", the use amount of the glossy paper can be set to "2", or the like. The process type is recorded as "copy" in case of the copying process and "print" in case of the printing process.

Figure 9:
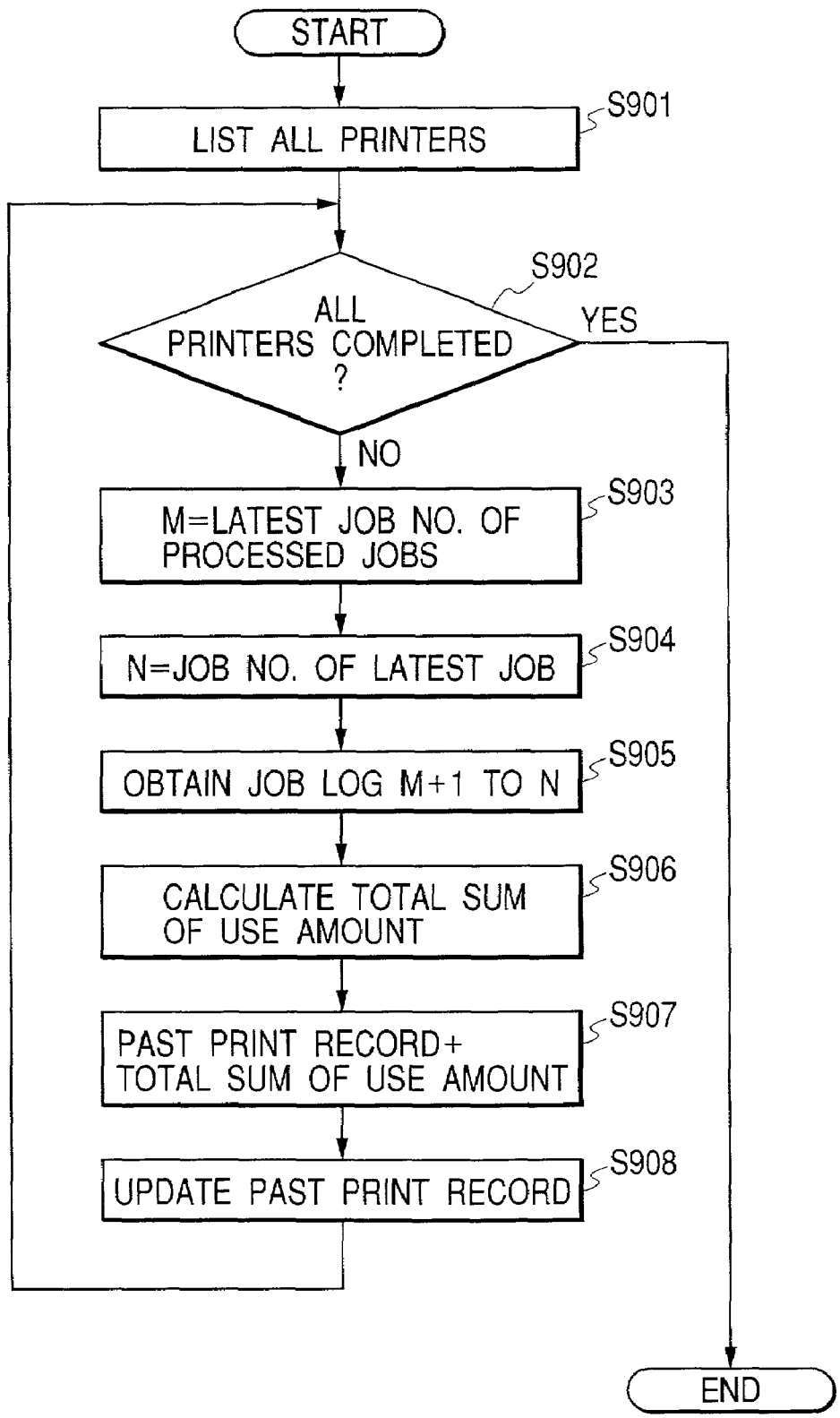
FIG. 9 is a flowchart showing processes of the server computer.

FIG. 9 is a flowchart showing processes of the server computer 110. These processes are periodically executed at regular intervals.

In step S901, all of the printers in the network are listed and recorded into the RAM. As a listing method, the printers which have previously been registered by the administrator of the network can be listed, or it is also possible to broadcast a message onto the network, receive a reply to the message from the printer, and list the printers which returned the reply. Subsequently, the processes are sequentially executed with respect to all of the printers recorded (listed) in the RAM.

In step S902, whether the scan of all of the printers has been finished or not is discriminated. If YES, the processing routine is finished. If NO, step S903 follows. In step S903, the job number of the latest job among the processed jobs is obtained from the job log of a certain printer. This job number is assumed to be "M" here. Whether the job has already been processed or not can be discriminated by referring to the process flag (FIG. 8) of the job log of each job.

In step S904, the job number of the latest job among the job logs of the printer is obtained. This job number is assumed to be "N" here. In step S905, the job logs of the job Nos. M+1 to N are obtained from the printer.

In step S906, the total sum of the use amounts of the obtained job logs is obtained. In step S907, the past print record of the printer is obtained from the printer and the total sum obtained in step S906 is added to the past print record of the printer. In step S908, the past print record of the printer is updated to the past print record calculated in step S907.

The past print record of the printer can be the number of print papers or the number of printing times, or it can be also the number of print papers or the number of printing times based on the process of the print job from the host computer. Further, it can be also the total of the number of print papers based on the copy by the printer and the number of print papers based on the process of the print job, or it can be also the total of the number of printing times based on the copy by the printer and the number of printing times based on the process of the print job.

As described above, the server computer connected to the network periodically obtains the job logs in the printer and updates the past print records of a plurality of printers connected to the network, so that the server computer can make management of use of the plurality of printers on the network without holding the past print records. Even when the server computer is not operating, the user can use the printer.

Although the printer holds the past print record and the upper limit in the above embodiment, the invention is also effective in the case where the printer does not hold the past print record or the upper limit.

Figure 10:
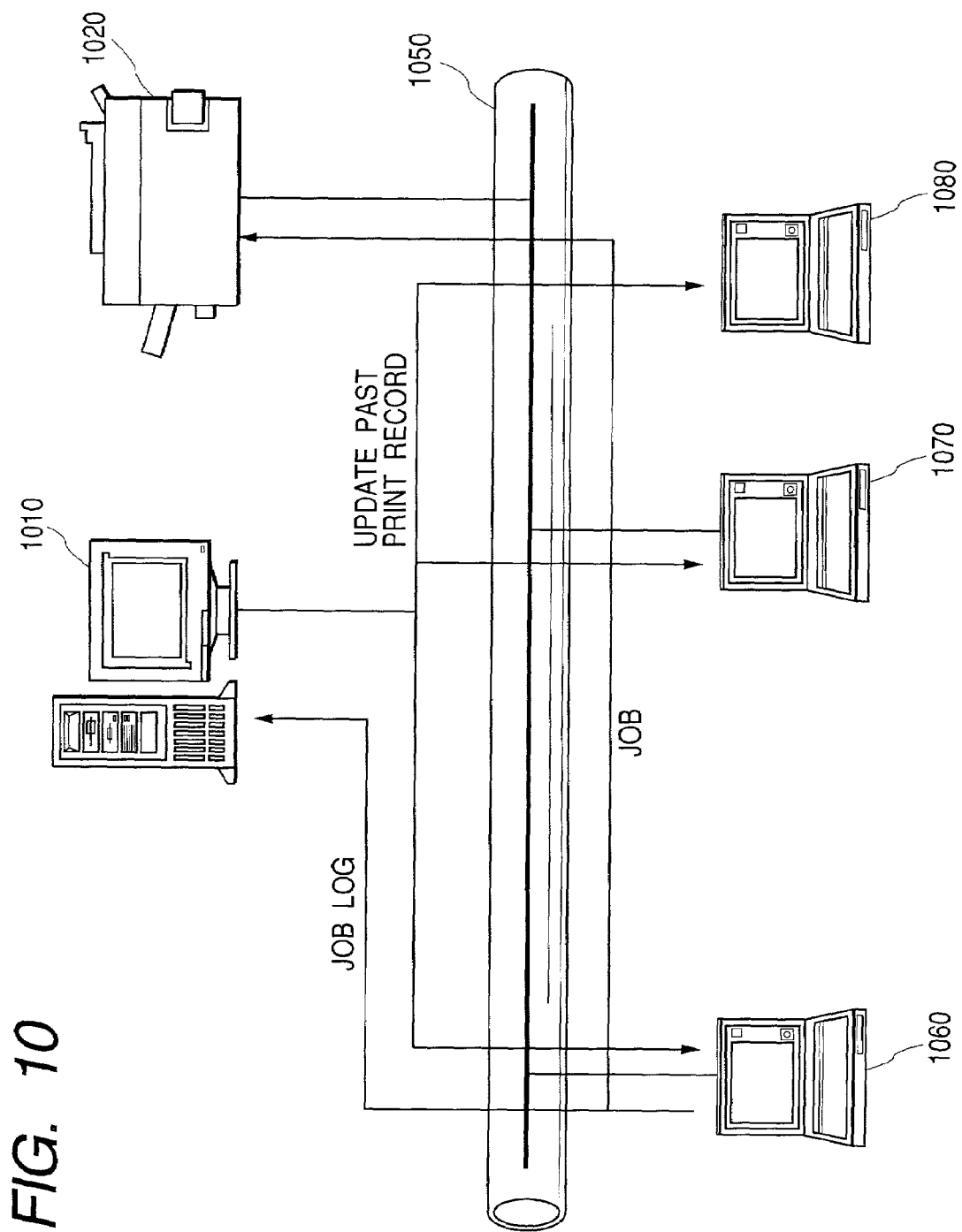
FIG. 10 is a diagram showing a fundamental construction of a whole second print management system.
Figure 11:
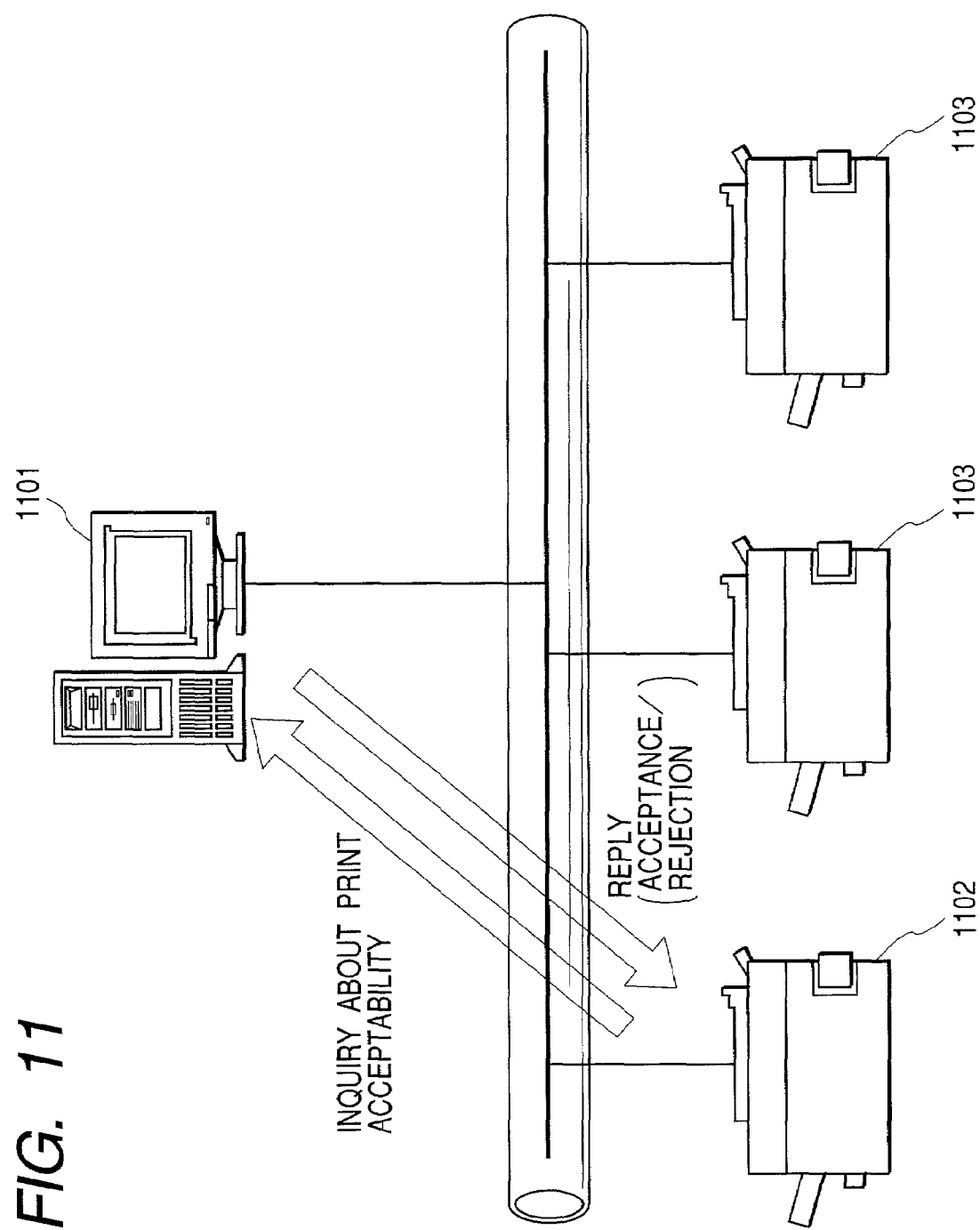
FIG. 11 is a diagram showing a network to which a print management server and a plurality of printers are connected.

FIG. 10 is a diagram showing a fundamental construction of a whole second print management system. Reference numeral 1010 denotes a server computer which communicates with client computers connected to a network and executes various processes. Reference numerals 1060, 1070, and 1080 denote client computers. Reference numeral 1020 denotes a printer for receiving print data which is inputted from the client computers 1060, 1070, and 1080 and executes the printing.

In the client computers 1060, 1070, and 1080, a control program according to the invention operates, and each of them holds a past print record and an upper limit in a manner similar to the printers mentioned above. When the print data is transmitted to the printer 1020, the control program analyzes the print data, thereby forming job logs similar to those shown in FIG. 8. The client computer executes processes similar to those of the foregoing printer.

That is, the client computer compares the past print record with the upper limit before transmitting the print data. Only when the past print record does not exceed the upper limit, transmission of the print data is enabled. When the past print record exceeds the upper limit, transmission of the print data is disabled. When the print data is transmitted, its details are recorded as a job log. The server computer periodically obtains the job log from each client computer and updates the past print record of each client computer on the basis of the obtained job log.

By using the above method, the server computer can make management of use of the printers from a plurality of client computers on the network without holding the past print records. Even when the server computer does not operate, the user can execute processes.

A situation such that when the past print record reaches the upper limit, use of the printer suddenly becomes unacceptable is avoided, use of the printer is limited, and the user is notified of the limitation in accordance with a current use amount for the past print record, thereby improving convenience for the user.

According to the invention as described above, the management of use of the printers can be made irrespective of the operation or non-operation of the print management server. A waiting time for use of the printer can be also shortened. The use efficiency of the print management server and the operability of the printers are improved.

Second Embodiment

A print managing apparatus according to an embodiment of the invention will be described in detail hereinbelow with reference to the drawings.

Figure 14:
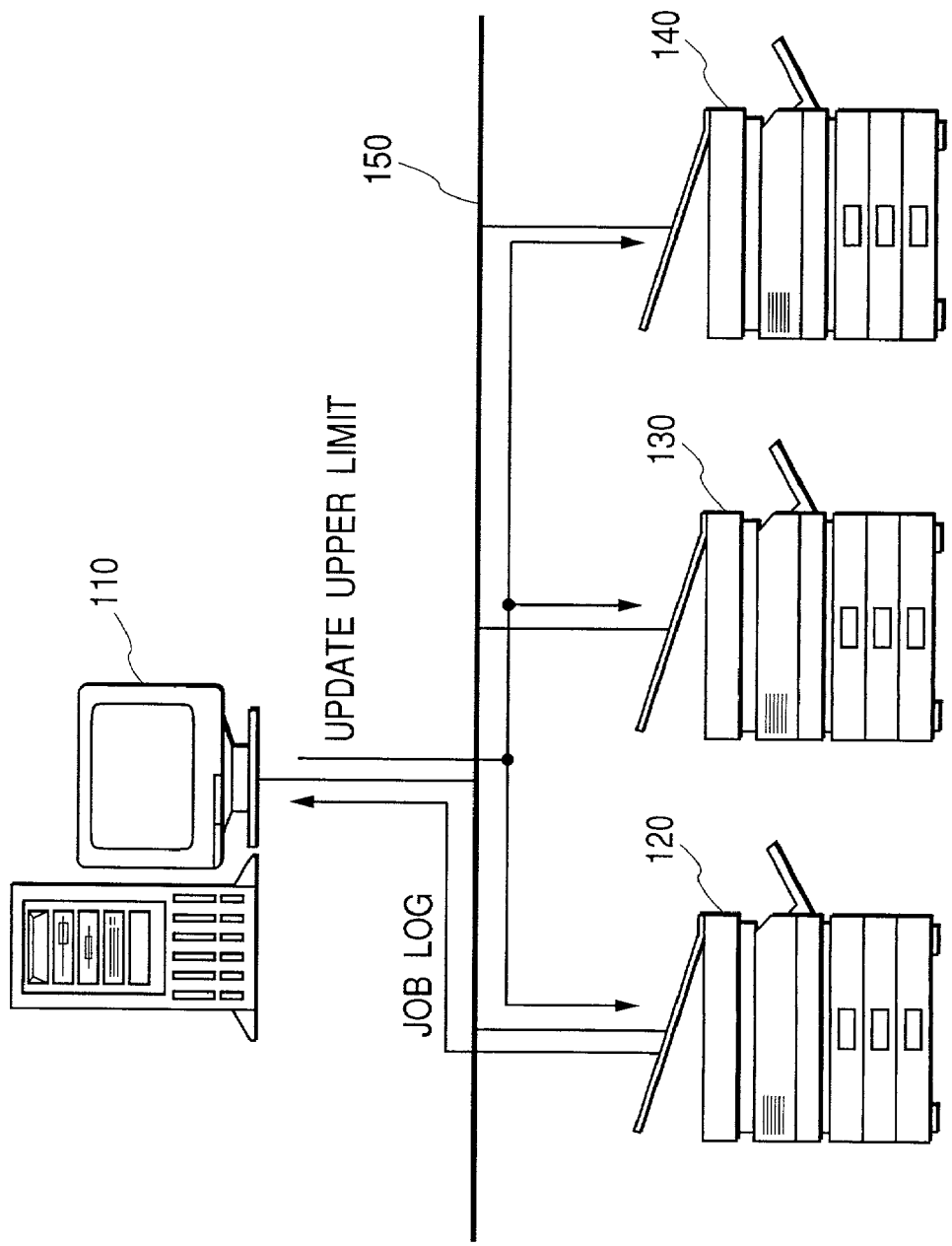
FIG. 14 is a schematic diagram showing a whole construction of the print management system.

FIG. 14 is a schematic diagram showing a whole construction of a print management system having the print managing apparatus according to the embodiment of the invention.

In FIG. 14, the server computer 110 updates an upper limit. In the system of FIG. 14, when the server computer 110 is operating, a control process in a copy mode in FIG. 16, which will be explained hereinlater, is executed and a print managing process in FIG. 17, which will be explained hereinlater, is executed. When the server computer 110 does not operate, only the control process in the copy mode in FIG. 16 is executed.

Figure 15:
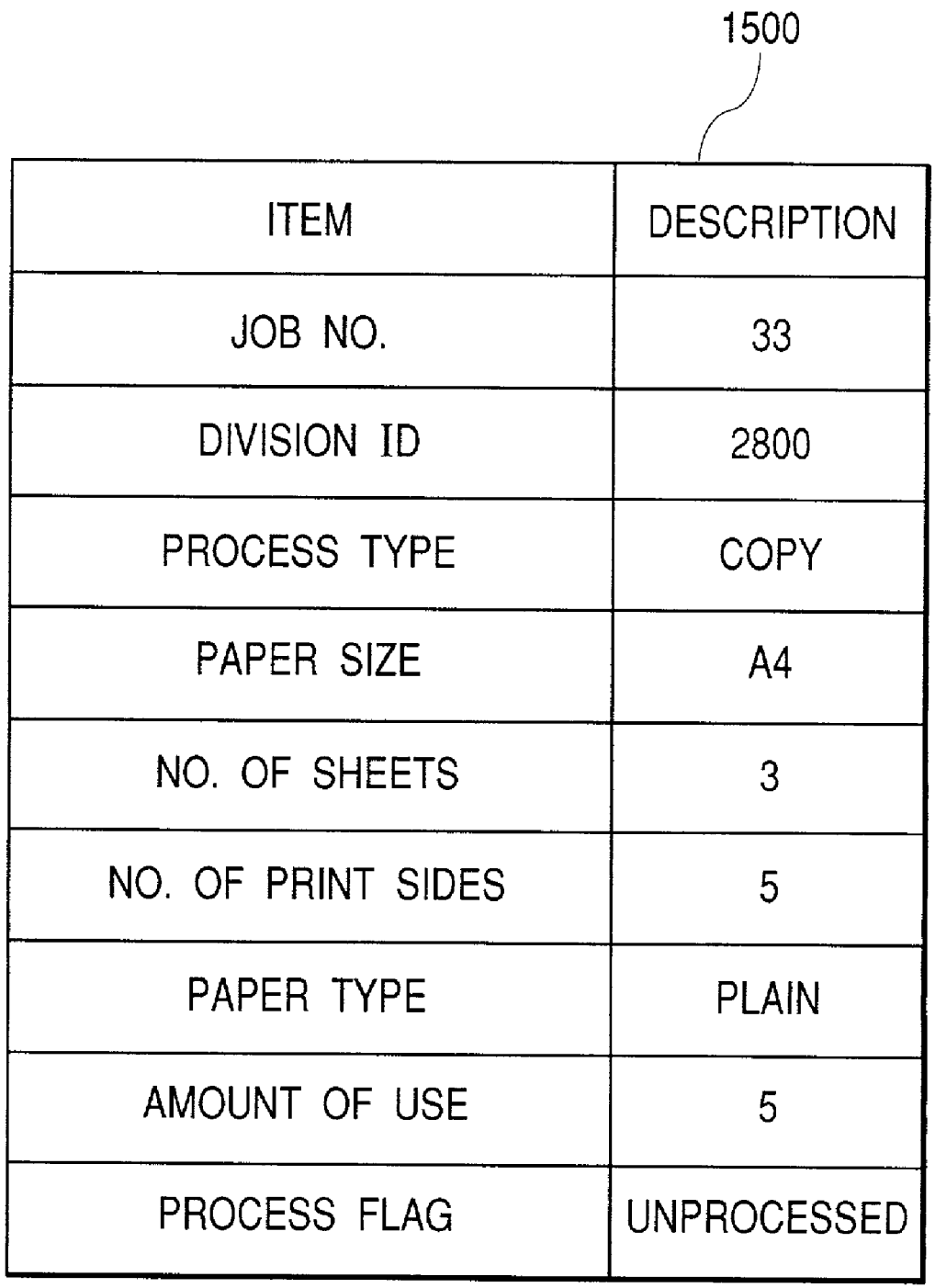
FIG. 15 is a schematic diagram of job logs.

FIG. 15 is a schematic diagram of job logs which are stored onto the HD 304 in FIG. 3.

In FIG. 15, a job log 1500 is a copy history regarding use of the printer 120 by the user. Contents corresponding to each item of a job number, a division ID, a process type, a paper size, the number of sheets, the number of print sides, a paper type, an amount of use, and a process flag are stored into the job log 1500. The number allocated to a using order of the user is stored into the Job number. A division ID inputted by the user is stored into the division ID. The used (processed) operation such as copy, printing, image reading, or the like is stored into the process type. The number of sheets used by the copy or the like is stored into the number of sheets. The number of print sides obtained by counting the used print sheets with respect to each of the obverse and reverse sides is stored into the number of print sides. A type of used paper such as plain paper, glossy paper, OHP paper, or the like is stored into the paper type. The number of sheets, the number of print sides, or the like is stored into the amount of use as it is. A numerical value which is stored into the amount of use can be also a value multiplied by a coefficient in dependence on the paper size or paper type. For example, when the A4 paper is used, such a numerical value is set to "2" for the A3 paper and stored. When the plain paper is used, "2" is stored for the glossy paper. The process flag indicates whether the job log 1500 has been updated by the print managing process in FIG. 17, which will be explained hereinlater, or not. "unprocessed" denotes that updating process is not executed yet.

Figure 16:
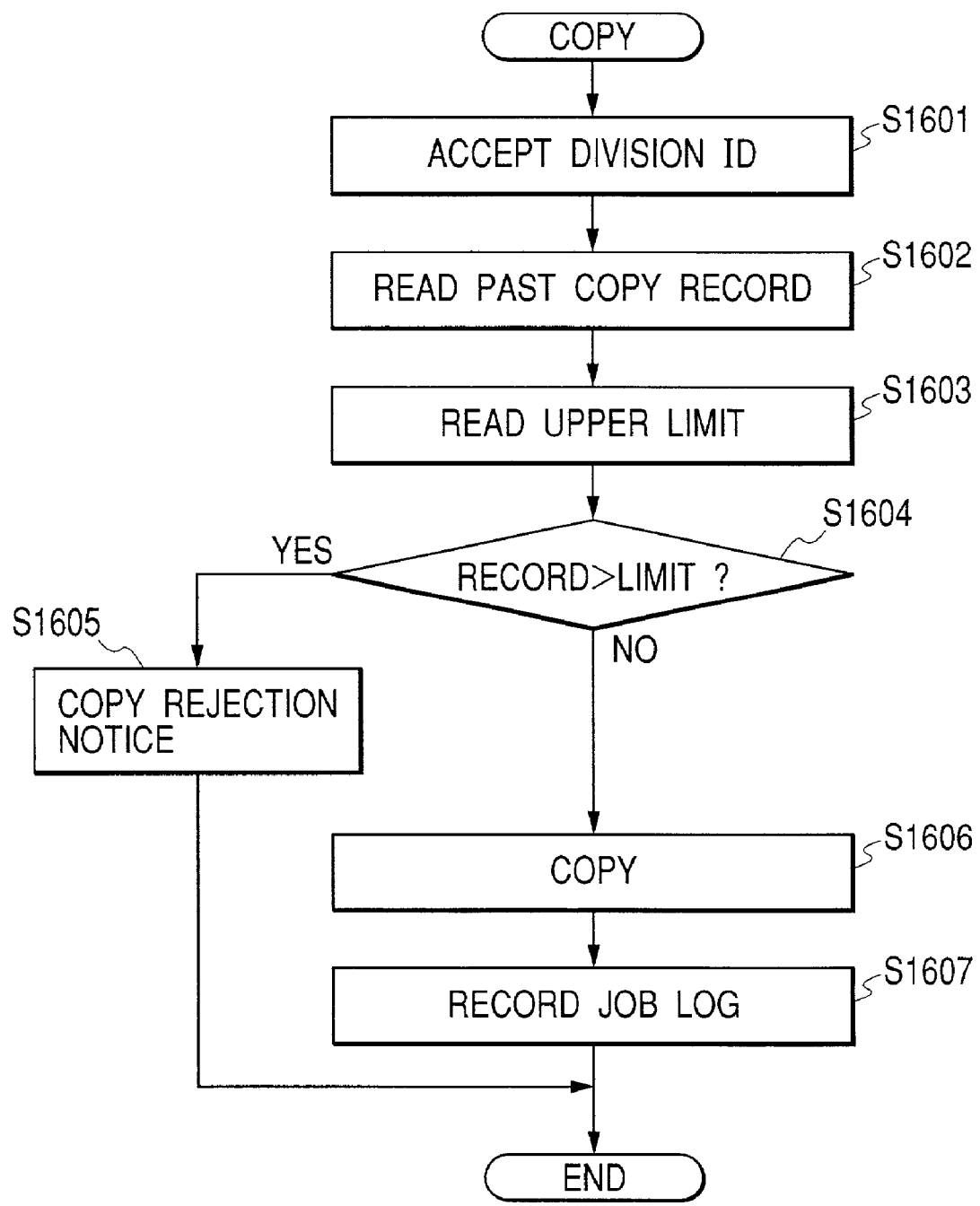
FIG. 16 is a flowchart showing a control process upon copying.

FIG. 16 is a flowchart showing the control process in the copy mode which is executed by the CPU 301 in FIG. 3. In FIG. 16, the division ID inputted by the user from the user interface 308 is accepted (step S1601). Subsequently, a past copy record stored on the HD 304 is read out on the basis of the accepted division ID (step S1602). The past copy record is the total sum of the use amounts calculated on the basis of the job log 1500. Subsequently, an upper limit stored on the HD 304 is read out on the basis of the accepted division ID (step S1603). The upper limit is the number of copy (print) papers which can be copied (printed) by the printer 120 and is periodically updated during the operation of the server 110. The upper limit can be also the number of copying (printing) times.

Subsequently, whether the read-out past copy record exceeds the upper limit (past copy record>the upper limit) or not is discriminated (step S1604). When the read-out past copy record exceeds the upper limit (YES in step S1604), step S1605 follows. When it does not exceed the upper limit (NO in step S1604), the copying process is executed in accordance with the operation of the user (step S1606). At this time, the job log 1500 at the time of the copying process is formed. The job log 1500 and the past copy record updated on the basis of the job log 1500 are stored onto the HD 304 (step S1607). The processing routine is finished.

In step S1605, the user interface 308 notifies the user of a message showing "since the past copy record exceeds the upper limit, use is rejected", use of the printer by the user is inhibited (step S1605), and the processing routine is finished. Although use of the printer by the user who intends to use the printer 120 is inhibited in step S1605, use of the printer by the whole division to which the user belongs can be also inhibited.

According to the processes shown in FIG. 16, the past copy record and the upper limit which were stored on the HD 304 are read out on the basis of the division ID inputted by the user (steps S1602, S1603). When the read-out past copy record does not exceed the upper limit (NO in step S1604), the copying process is executed in accordance with the operation of the user (step S1606). The past copy record updated on the basis of the job log 1500 is stored onto the HD 304 together with the job log 1500 at the time of the copying process. Therefore, the past copy record in the printer 120 can be managed irrespective of the operation or non-operation of the server computer 110.

In FIG. 16, the past copy record is compared with the upper limit in step S1604. When the copying process is executed, the past copy record is subtracted in step S1607. However, it is also possible to construct in a manner such that whether the upper limit is equal to 0 or not is discriminated in step S1604, if the upper limit is equal to 0, step S1605 follows, and if the upper limit is larger than 0, step S1606 follows. In this case, the upper limit is subtracted on the basis of the job log in step S1607.

Figure 17:
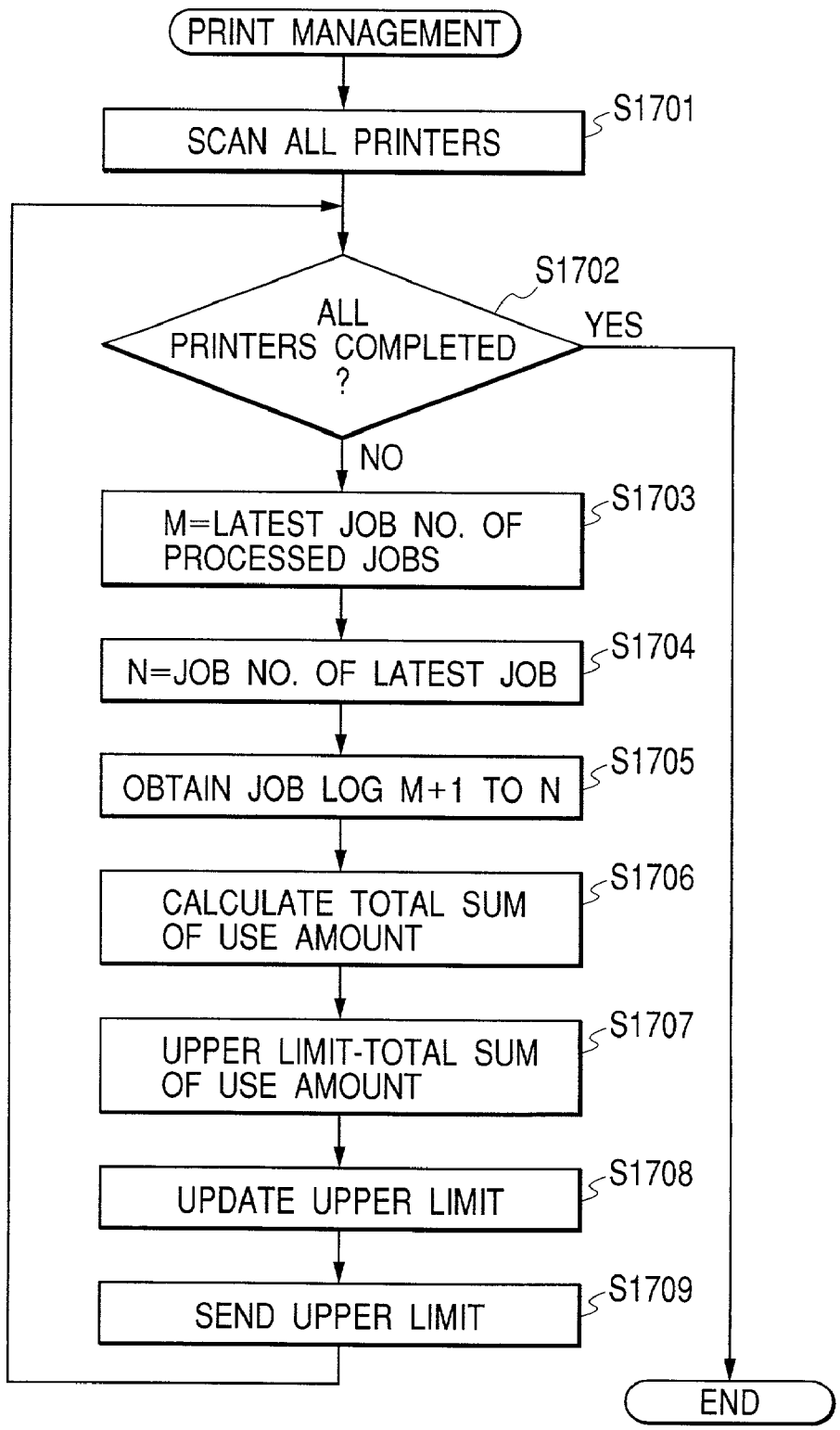
FIG. 17 is a flowchart showing a print managing process.

FIG. 17 is a flowchart showing the print managing process which is executed by the CPU 201 in FIG. 2. In FIG. 17, the CPU 201 scans all of the printers 120, 130, and 140 on the network 150 and allows data to be stored into the RAM 203 (step S1701). Subsequently, whether the updating process of all of the printers 120, 130, and 140 has been finished or not is discriminated (step S1702). If the updating process is not finished yet (NO in step S1702), the latest job number of the processed job log is obtained from the printer (for example, printer 120) whose updating process is not finished yet and set to "M" (step S1703). Whether the job log 1500 has been processed or not is discriminated by-referring to the process flag in the job log 1500. The job number of the latest job is subsequently obtained from the printer 120 and set to "N" (step S1704).

In step S1705, the job logs 1500 corresponding to the job Nos. (M+1) to N are obtained from the printer 120. The total sum of the use amounts is calculated on the basis of the obtained job logs 1500 (step S1706). Subsequently, the total sum of the use amounts calculated in step S1706 is subtracted from the upper limit of the printer 120 stored on the HD 206 (step S1707). The resultant subtracted upper limit is updated as a new upper limit of the printer 120 (step S1708). Subsequently, the updated upper limit is transmitted to the printer 120 and the upper limit stored on the HD 304 is updated (step S1709). The processing routine is finished. During the operation of the server 110, the present processing routine is periodically executed at regular intervals.

According to the processes shown in FIG. 17, the job logs 1500 are periodically obtained from the printers 120, 130, and 140 on the network 150 (steps S1703 to S1705) and the upper limits of the printers 120, 130, and 140 are updated on the basis of the obtained job logs 1500 (step S1708). Therefore, the printing can be performed without inquiring of the server 110 by the printer 120, and the waiting time for use of the printer 120 can be shortened.

According to the second embodiment, when the server 110 is operating, the upper limit in the printer 120 is updated on the basis of the job log 1500 obtained from the printer 120 on the network 150 (step S1708). Therefore, the printing can be performed without inquiring of the server 110 by the printer 120. The waiting time for use of the printer 120 can be shortened. When the server 110 does not operate, since only the control process in the copy mode in FIG. 16 is executed, use of the printer 120 can be managed irrespective of the operation or non-operation of the server 110.

Third Embodiment

Since a fundamental construction of the third embodiment is substantially the same as that of the first or second embodiment, only a construction different from that of the first or second embodiment will be described.

Figure 18:
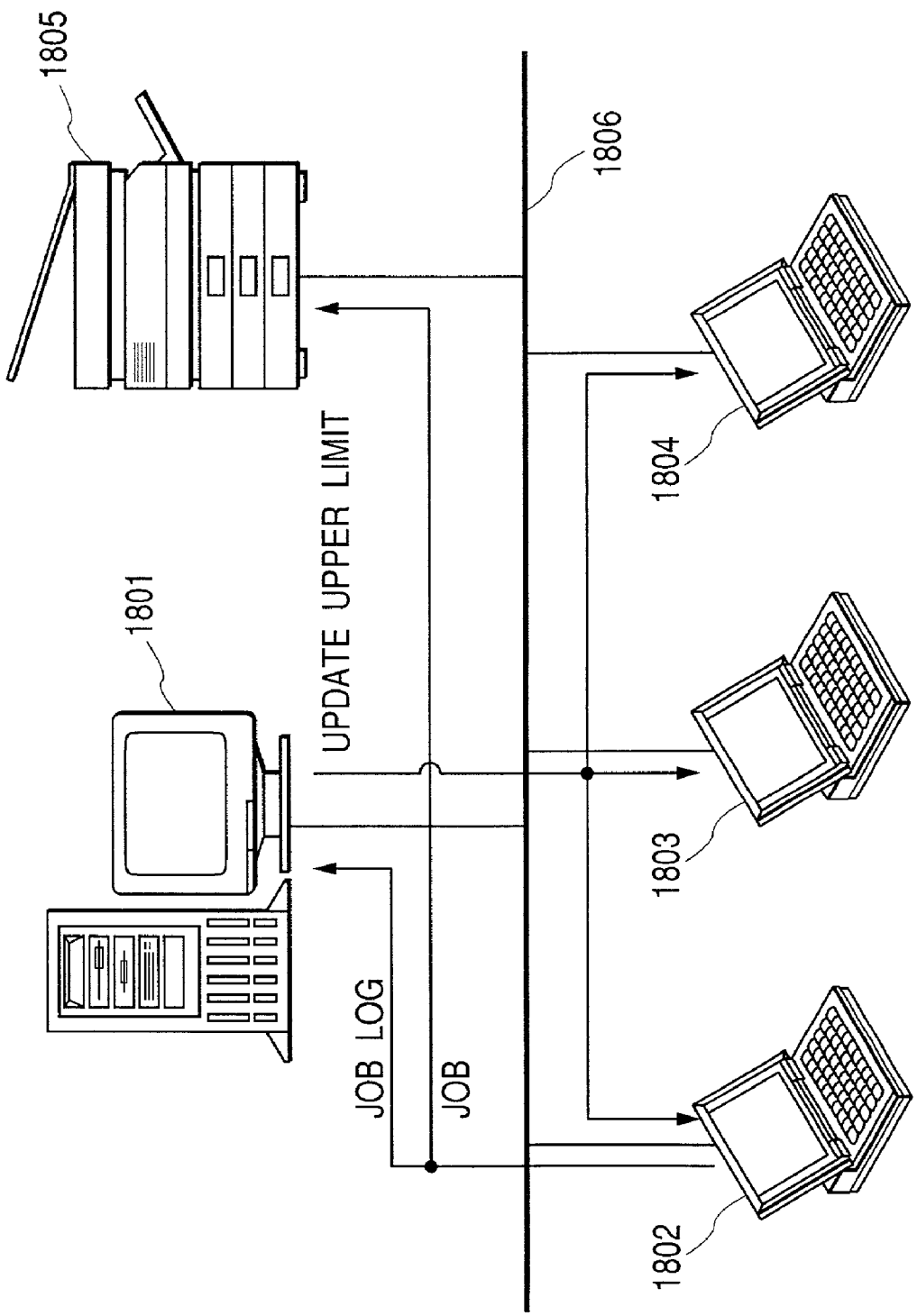
FIG. 18 is a schematic diagram showing a whole construction of the print management system.

FIG. 18 is a schematic diagram showing a whole construction of a print management system having an information processing apparatus according to the third embodiment of the invention. In FIG. 18, the print management system comprises: a server 1801 (print managing apparatus) constructed by a server computer or the like; clients 1802 to 1804 (information processing apparatuses) each of which is constructed by a personal computer having an HD (not shown) or the like and which are connected to the server 1801 through a network 1806; and a printer 1805 connected to the server 1801 through the network 1806.

The server 1801 communicates with each of the clients 1802 to 1804 through the network 1806 and executes various processes for managing print data or the like which is transmitted from the clients 1802 to 1804 to the printer 1805. Each of the clients 1802 to 1804 forms the print data, image data, or the like and transmits the print data or the like to the printer 1805. The printer 1805 receives the print data or the like transmitted from the clients 1802 to 1804 and executes the printing, copy, or the like on the basis of the print data or the like.

In the embodiment, each of the clients 1802 to 1804 stores a past print record and an upper limit with respect to the printer 1805 on the network 1806 onto an HD (not shown) and executes the control process in the copy mode in FIG. 16 on the basis of the past print record and the upper limit.

In the processes shown in FIG. 16, the past copy record and the upper limit stored on the HD (not shown) are read out on the basis of the division ID inputted by the user (steps S1602, S1603). When the past copy record does not exceed the upper limit (NO in step S1604), the print data is transmitted to the printer 1805 in accordance with the operation of the user (step S1606). Subsequently, when the print data or the like is transmitted to the printer 1805, the print data is analyzed, the job log 1500 in FIG. 4 is formed, and the job log 1500 and the past copy record updated on the basis of the job log 1500 are stored onto the HD (step S1607).

In the embodiment, by the print managing process in FIG. 17, the server 1801 periodically obtains the job logs 1500 in the clients 1802 to 1804 on the network 1806 and updates the past print records stored in the clients 1802 to 1804.

According to the third embodiment, the server 1801 obtains the job log 1500 from the client 1802 on the network 1806 (steps S1703 to S1705) and updates the upper limit in the client 1802 on the basis of the obtained job log 1500 (step S1708). Therefore, the printing can be performed without inquiring of the server 1801 by the client 1802 and the waiting time for the printing in the client 1802 can be shortened.

When the server 1801 does not operate, since only the control process in the copy mode in FIG. 16 is executed, use of the client 1802 can be managed irrespective of the operation or non-operation of the server 1801.

The printers 120, 130, 140, and 1805 in the second and third embodiments can be also peripheral devices such as printers, scanners, and the like.

In the second and third embodiments, the application program for executing the print managing process in FIG. 17 is stored on the HD 206 by the contents shown in FIG. 6. However, the invention can be also accomplished by a method whereby, in place of the HD 206, a predetermined memory medium is supplied from the outside to the servers 110 and 1801 and the CPU 201 or the like reads out the application program stored in the memory medium and executes functions according to the application program.

As described in detail above, according to the invention, the print managing apparatus (server computer) for making print management updates the upper limit on the basis of the print history obtained from the memory means of the printer and transmits the updated upper limit to the printer. Therefore, the printing can be performed without inquiring of the print managing apparatus by the printer and the waiting time for use of the printer can be shortened.

The printer compares the past print record with the upper limit and updates the past print record on the basis of the print history when the past print record does not exceed the upper limit. Therefore, use of the printer can be managed irrespective of the operation or non-operation of the print managing apparatus.

The printer discriminates whether the upper limit has reached "0" or not and updates the upper limit on the basis of the print history when the upper limit is larger than "0". Therefore, use of the printer can be managed irrespective of the operation or non-operation of the print managing apparatus.

What is claimed is:

1. A print managing apparatus which communicates with a plurality of printing apparatuses and controls acceptance or rejection of execution of a printing on the basis of a print amount, comprising:

obtaining means for obtaining a print history of a predetermined user stored in each of the plurality of printing apparatuses;

determining means for determining the print amount of the predetermined user in the plurality of printing apparatuses by accumulating the print history of each of the plurality of printing apparatuses obtained by said obtaining means; and updating means for transferring, via a network, the print amount of the predetermined user determined by said determining means to each of the plurality of printing apparatuses so as to update the print amount stored in each of the plurality of printing apparatuses, wherein the updated print amount of the predetermined user is used at each of the plurality of printing apparatuses to judge whether the predetermined user is allowed to print.

2. An apparatus according to claim 1, wherein said obtaining means obtains the print history of said printer at regular intervals, and said updating means updates the print amount of said printer in accordance with the obtainment of the print history of said printer by said obtaining means.

3. An apparatus according to claim 1, wherein
said print managing apparatus manages a plurality of printers,
said obtaining means obtains the print history for each of said printers,
said determining means determines the print amount for each of said printers, and
said updating means updates the print amount for each of said printers.

4. An apparatus according to claim 1, wherein said printer is a copier or a printer for printing print data from a host computer.

5. An apparatus according to claim 1, wherein said print amount is the number of print papers or the number of printing times.

6. A print managing apparatus which manages a printing issued from each of a plurality of information processing apparatuses and controls acceptance or rejection of execution of the printing on the basis of a print use amount indicative of an amount of use of a printing apparatus, comprising:
obtaining means for obtaining a print history of a predetermined user stored in each of the plurality of information processing apparatuses;
determining means for determining the print use amount of the predetermined user in the plurality of information processing apparatuses by accumulating the print history of each of the plurality of information processing apparatuses obtained by said obtaining means; and
updating means for transferring, via a network, the print use amount of the predetermined user determined by said determining means to each of the plurality of information processing apparatuses so as to update the print use amount stored in the information processing apparatus,
wherein the updated print user amount of the predetermined user is used at each of the plurality of information processing apparatuses to judge whether the predetermined user is allowed to print.

7. An apparatus according to claim 6, wherein
said obtaining means obtains the print history of said information processing apparatus at regular intervals, and
said updating means updates the print use amount of said information processing apparatus in accordance with the obtainment of the print history of said information processing apparatus by said obtaining means.

8. An apparatus according to claim 6, wherein
said print managing apparatus manages a plurality of information processing apparatuses,
said obtaining means obtains the print history for each of said information processing apparatuses,
said determining means determines the print use amount for each of said information processing apparatuses, and
said updating means updates the print use amount for each of said information processing apparatuses.

9. An apparatus according to claim 6, wherein said printer is a printer for printing a print job from said information processing apparatus.

10. An apparatus according to claim 6, wherein said print use amount is the number of print papers or the number of printing times.

11. A print managing apparatus which communicates with a plurality of printing apparatuses and manages a printing on the basis of an upper limit indicative of an amount to which each printing apparatus is allowed to print for a predetermined user, comprising:
obtaining means for obtaining a print history of the predetermined user stored in each of the plurality of printing apparatuses;
updating means for updating said upper limit of the predetermined user in each of the plurality of printing apparatuses on the basis of the obtained print history; and
transmitting means for transmitting the updated upper limit to each of the plurality of printing apparatuses so as to update the upper limit of the predetermined user stored in the printing apparatuses.

12. An apparatus according to claim 11, wherein
said obtaining means obtains the print history of said printer at regular intervals, and
said updating means updates said upper limit in accordance with the obtainment of the print history of said printer by said obtaining means.

13. An apparatus according to claim 11, wherein
said print managing apparatus manages a plurality of printers,
said obtaining means obtains the print history for each of said printers, and
said updating means updates the upper limit for each of said printers.

14. An apparatus according to claim 11, wherein said printer is a copier or a printer for printing print data from a host computer.

15. An apparatus according to claim 11, wherein said upper limit is the number of papers which can be printed or the number of times to which the printing can be performed.

16. A print managing apparatus which communicates with a plurality of information processing apparatuses and manages a printing on the basis of an upper limit indicative of an amount of papers which a printer is allowed to print for a predetermined user, comprising:
obtaining means for obtaining a print history of the predetermined user stored in each of the plurality of said information processing apparatuses;
updating means for updating said upper limit of the predetermined user on the basis of the obtained print history; and
transmitting means for transmitting the updated upper limit to each of the plurality of information processing apparatuses so as to update the upper limit of the predetermined user stored in the information processing apparatus.

17. An apparatus according to claim 16, wherein said upper limit is the number of papers which can be printed or the number of times to which the printing can be performed.

18. An apparatus according to claim 16, wherein said printer is a copier or a printer.

19. A print managing method of managing a printing in a plurality of printing apparatuses which controls acceptance or rejection of execution of the printing on the basis of a print amount, comprising:
an obtaining step of obtaining a print history of a predetermined user stored in each of the plurality of printing apparatuses;
a determining step of determining the print amount of the predetermined user in the plurality of printing apparatuses by accumulating the print history of each of the plurality of printing apparatuses obtained by said obtaining step; and an updating step of transferring, via a network, the print amount of the predetermined user determined by said determining step to each of the plurality of printing apparatuses so as to update the print amount stored in each of the plurality of printing apparatuses, wherein the updated print amount of the predetermined user is used at each of the plurality of printing apparatuses to judge whether the predetermined user is allowed to print.

20. A method according to claim 19, wherein in said obtaining step, the print history of said printer is obtained at regular intervals, and in said updating step, the print amount of said printer is updated in accordance with the obtainment of the print history of said printer by said obtaining step.

21. A method according to claim 19, wherein said print managing method manages a plurality of printers, in said obtaining step, the print history is obtained for each of said printers, in said determining step, the print amount is calculated for each of said printers, and in said updating step, the print amount is for each of said printers.

22. A method according to claim 19, wherein said printer is a copier or a printer for printing print data from a host computer.

23. A method according to claim 19, wherein said print amount is the number of print papers or the number of printing times.

24. A print managing method which manages a printing issued from each of a plurality of information processing apparatuses and controls acceptance or rejection of execution of the printing on the basis of a print use amount indicative of an amount of use of a printing apparatus, comprising:

an obtaining step of obtaining a print history of a predetermined user stored in each of the plurality of information processing apparatuses;

a determining step of determining the print use amount of the predetermined user in the plurality of information processing apparatuses by accumulating the print history of each of the plurality of information processing apparatuses obtained by said obtaining step; and an updating step of transferring, via a network, the print use amount of the predetermined user calculated by said calculating step to each of the plurality of information processing apparatuses and updating the print use amount of the information processing apparatus, wherein the updated print use amount of the predetermined user is used at each of the plurality of information processing apparatuses to judge whether the predetermined user is allowed to print.

25. A method according to claim 24, wherein in said obtaining step, the print history of said information processing apparatus is obtained at regular intervals, and in said updating step, the print use amount of said information processing apparatus is updated in accordance with the obtainment of the print history of said information processing apparatus by said obtaining step.

26. A method according to claim 24, wherein said print managing method manages a plurality of information processing apparatuses, in said obtaining step, the print history is obtained for each of said information processing apparatuses, in said determining step, the print use amount is calculated for each of said information processing apparatuses, and in said updating step, the print use amount is updated for each of said information processing apparatuses.

27. A method according to claim 24, wherein said printer is a printer for printing a print job from said information processing apparatus.

28. A method according to claim 24, wherein said print use amount is the number of print papers or the number of printing times.

29. A print managing method of managing a printing in a printer which communicates with a plurality of printing apparatuses and manages the printing on the basis of an upper limit indicative of an amount to which each printing apparatus is allowed to print for a predetermined user, comprising:

an obtaining step of obtaining a print history of the predetermined user stored in each of the plurality of printing apparatuses;

an updating step of updating said upper limit of the predetermined user in each of the plurality of printing apparatuses prainters on the basis of the obtained print history; and a transmitting step of transmitting the updated upper limit to each of the plurality of printing apparatuses so as to update the upper limit of the predetermined user stored in the each printing apparatus.

30. A method according to claim 29, wherein in said obtaining step, the print history of said printer is obtained at regular intervals, and in said updating step, said upper limit is updated in accordance with the obtainment of the print history of said printer by said obtaining step.

31. A method according to claim 29, wherein said print managing method manages a plurality of printers, in said obtaining step, the print history is obtained for each of said printers, and in a determining step, the upper limit is updated for each of said printers.

32. A method according to claim 29, wherein said printer is a copier or a printer for printing print data from a host computer.

33. A method according to claim 29, wherein said upper limit is the number of papers which can be printed or the number of times to which the printing can be performed.

34. A print managing method of managing a printing from a plurality of information processing apparatuses which communicates with a plurality of information processing apparatuses and manages the printing on the basis of an upper limit indicative of an amount of papers which a printer is allowed to print for a predetermined user, comprising:

an obtaining step of obtaining a print history of the predetermined user stored in each of the plurality of information processing apparatuses;

an updating step of updating said upper limit of the predetermined user on the basis of the obtained print history; and a transmitting step of transmitting the updated upper limit to each of the plurality of information processing apparatuses so as to update the upper limit of the predetermined user stored in the information processing apparatus.

35. A method according to claim 34, wherein said upper limit is the number of papers which can be printed or the number of times to which the printing can be performed.

36. A method according to claim 34, wherein said printer is a copier or a printer.

37. A computer-readable storage medium which stores a computer-executable program that is executed by a print managing apparatus which communicates with a plurality of printing apparatuses and controls acceptance or rejection of execution of a printing on the basis of a print amount, wherein said program allows a computer to execute:
- an obtaining step of obtaining a print history of a predetermined user stored in each of the plurality of printing apparatuses;
- a determining step of determining the print amount of the predetermined user in the plurality of printing apparatuses by accumulating the print history of each of the plurality of printing apparatuses obtained by said obtaining step; and
- an updating step of transferring, via a network, the print amount of the predetermined user determined by said determining step to each of the plurality of printing apparatuses so as to update the print amount stored in each of the plurality of printing apparatuses,
- wherein the updated print amount of the predetermined user is used at each of the plurality of printing apparatuses to judge whether the predetermined user is allowed to print.

38. A computer-readable storage medium which stores a computer-executable program that is executed by a print managing apparatus connected to a plurality of information processing apparatuses which manages and controls acceptance or rejection of execution of a printing on the basis of a print use amount indicative of an amount of use of a printing apparatus, wherein said program allows a computer to execute:
- an obtaining step of obtaining a print history of a predetermined user stored in each of the plurality of information processing apparatuses;
- a determining step of managing the print use amount of the predetermined user in the plurality of information processing apparatuses by accumulating the print history of each of the plurality of information processing apparatuses obtained by said obtaining step; and
- an updating step of transferring, via a network, the print use amount of the predetermined user determined by said determining step to each of the plurality of information processing apparatuses so as to update the print use amount stored in said information processing apparatus,
- wherein the updated print use amount of the predetermined user is used at each of the plurality of information processing apparatuses to judge whether the predetermined user is allowed to print.

39. A computer-readable storage medium which stores a computer-executable program that is executed by a print managing apparatus which communicates with a plurality of printing apparatuses and manages a printing on the basis of an upper limit indicative of an amount to which each printing apparatus is allowed to print for a predetermined user, wherein said program allows a computer to execute:
- an obtaining step of obtaining a print history of the predetermined user stored in each of the plurality of printing apparatuses;
- an updating step of updating said upper limit of the predetermined user in each of the plurality of printing apparatuses on the basis of the obtained print history; and
- a transmitting step of transmitting the updated upper limit to each of the plurality of printing apparatuses so as to update the upper limit of the predetermined user stored in the printing apparatuses.

40. A computer-readable storage medium which stores a computer-executable program that is executed by a print managing apparatus which communicates with a plurality of information processing apparatuses and manages a printing on the basis of an upper limit indicative of an amount of papers which a printer is allowed to print for a predetermined user, wherein said program allows a computer to execute:
- an obtaining step of obtaining a print history of the predetermined user stored in each of the plurality of information processing apparatuses;
- an updating step of updating said upper limit of the predetermined user on the basis of the obtained print history; and
- a transmitting step of transmitting the updated upper limit to each of the plurality of information processing apparatuses so as to update the upper limit of the predetermined user stored in the information processing apparatus.

* * * * *

UNITED STATES PATENT AND TRADEMARK OFFICE
CERTIFICATE OF CORRECTION

PATENT NO. : 7,177,034 B2  Page 1 of 1
APPLICATION NO. : 09971691
DATED : February 13, 2007
INVENTOR(S) : Nakagawa et al.

It is certified that error appears in the above-identified patent and that said Letters Patent is hereby corrected as shown below:

COLUMN 3:
Line 24, "read" should read -- read – --.

COLUMN 5:
Line 14, "those" should read -- this --.

COLUMN 6:
Line 33, "those" should read -- this --.

COLUMN 7:
Line 5, "the" (1st occurrence) should be deleted; and
Line 6, "the" (3rd occurrence) should be deleted.

COLUMN 10:
Line 47, "by-referring" should read -- by referring --.

COLUMN 12:
Line 64, "printer" should read -- plurality of printing apparatuses --;
Line 66, "printer" should read -- plurality of printing apparatuses --; and
Line 67, "printer" should read -- plurality of printing apparatuses --.

COLUMN 13:
Line 10, "printer is a" should read -- plurality of printing apparatuses includes a --; and
Line 59, "printer" should read -- printing apparatus --.

COLUMN 14:
Line 29, "printer" should read -- printing apparatus --.

COLUMN 16:
Line 6, "printer" should read -- printing apparatus --; and
Line 23, "prainters" should be deleted.

Signed and Sealed this

Ninth Day of February, 2010

David J. Kappos
*Director of the United States Patent and Trademark Office*